I. C. McDANIEL.
COLLAPSIBLE POULTRY COOP.
APPLICATION FILED MAR. 16, 1915.

1,173,823.

Patented Feb. 29, 1916.
2 SHEETS—SHEET 1.

Witnesses
M. H. Slifer
John J. McCarthy

Inventor
Ira C. McDaniel
By Victor J. Evans
Attorney

THE COLUMBIA PLANOGRAPH CO., WASHINGTON, D. C.

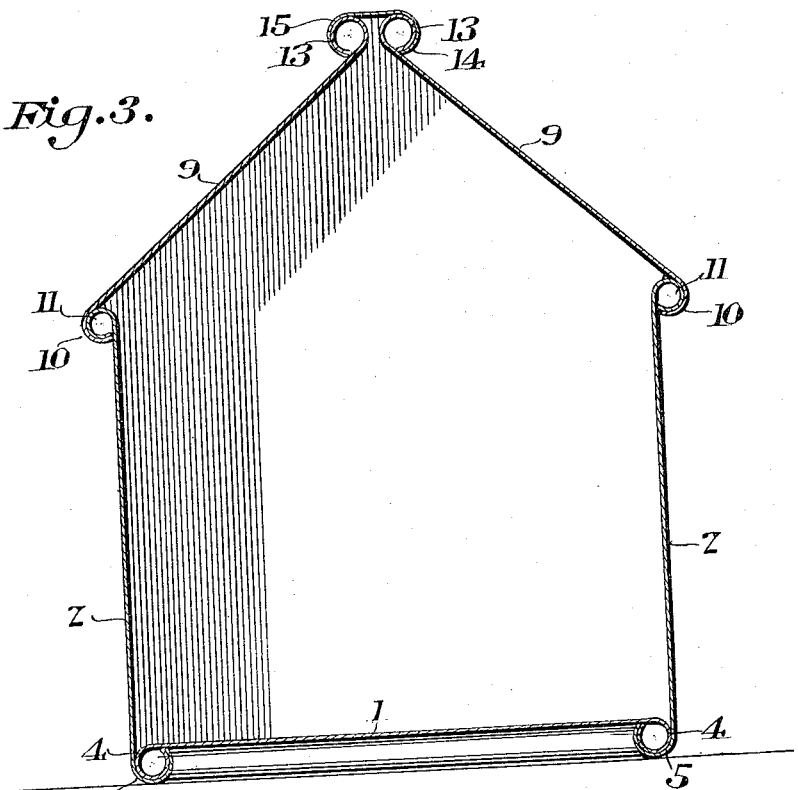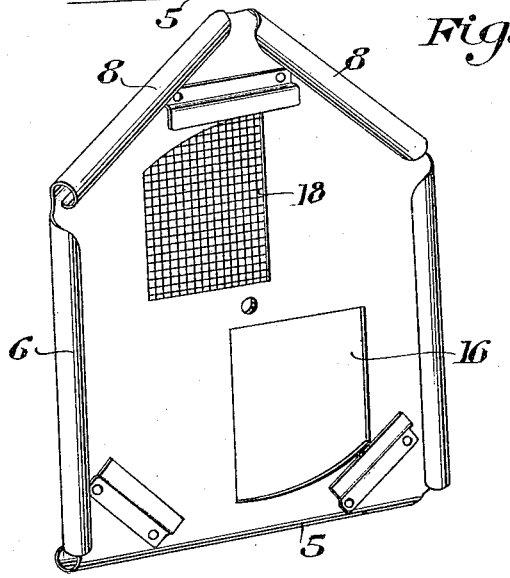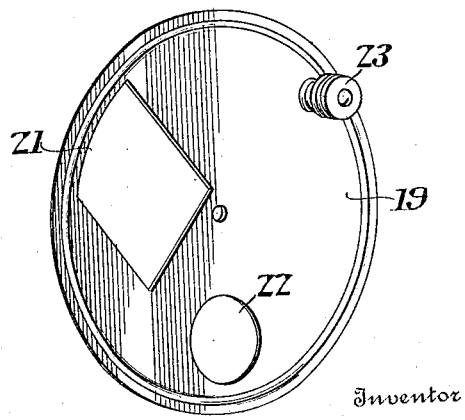

UNITED STATES PATENT OFFICE.

IRA C. McDANIEL, OF KANSAS, OHIO.

COLLAPSIBLE POULTRY-COOP.

1,173,823.   Specification of Letters Patent.   Patented Feb. 29, 1916.

Application filed March 16, 1915. Serial No. 14,708.

*To all whom it may concern:*

Be it known that I, IRA C. MCDANIEL, a citizen of the United States of America, residing at Kansas, in the county of Seneca and State of Ohio, have invented new and useful Improvements in Collapsible Poultry-Coops, of which the following is a specification.

In carrying out the present invention, it is my purpose to improve and simplify the general construction of knock-down poultry coops and to provide a poultry coop wherein the various walls may be readily assembled and disassembled when desired.

It is also my purpose to provide a device of the class described which will be constructed in such manner that the same may be thoroughly ventilated while the poultry is confined therein; the chickens permitted to enter and leave the coop while the mother hen is held therein; and the hen and chickens permitted to enter and leave the coop together.

With the above and other objects in view, the invention consists in the construction, combination and arrangement of parts hereinafter set forth in and falling within the scope of the claim.

Figure 1:
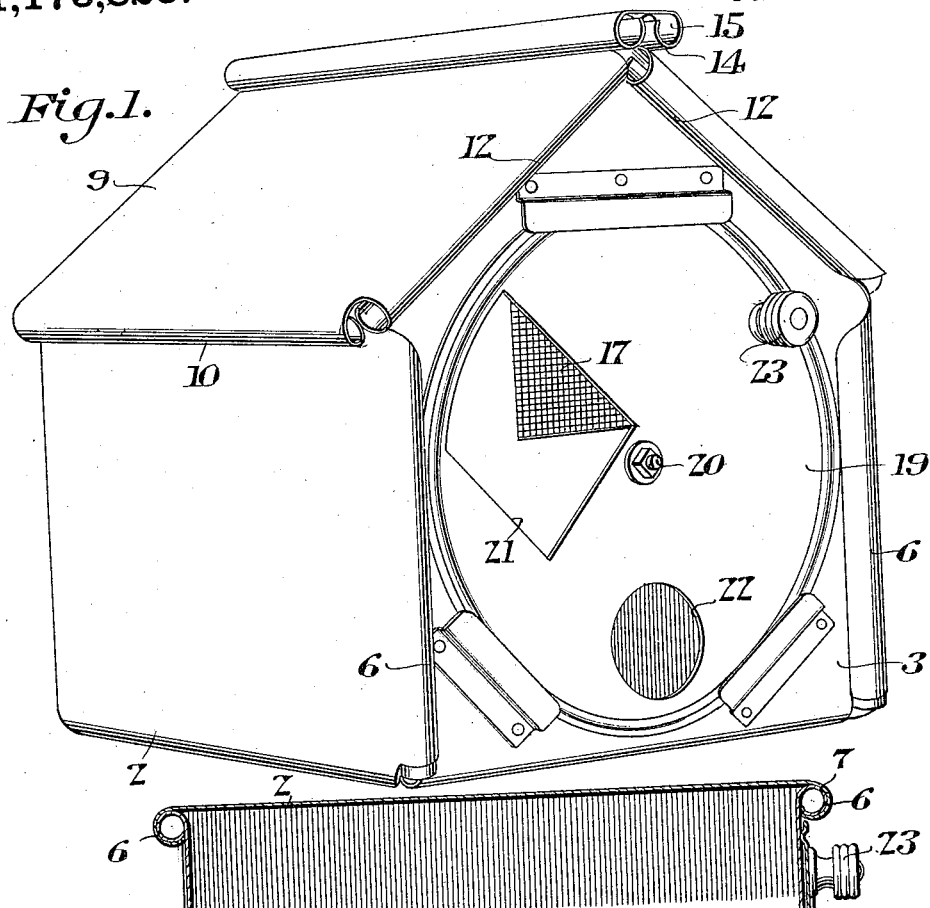
Figure 2:
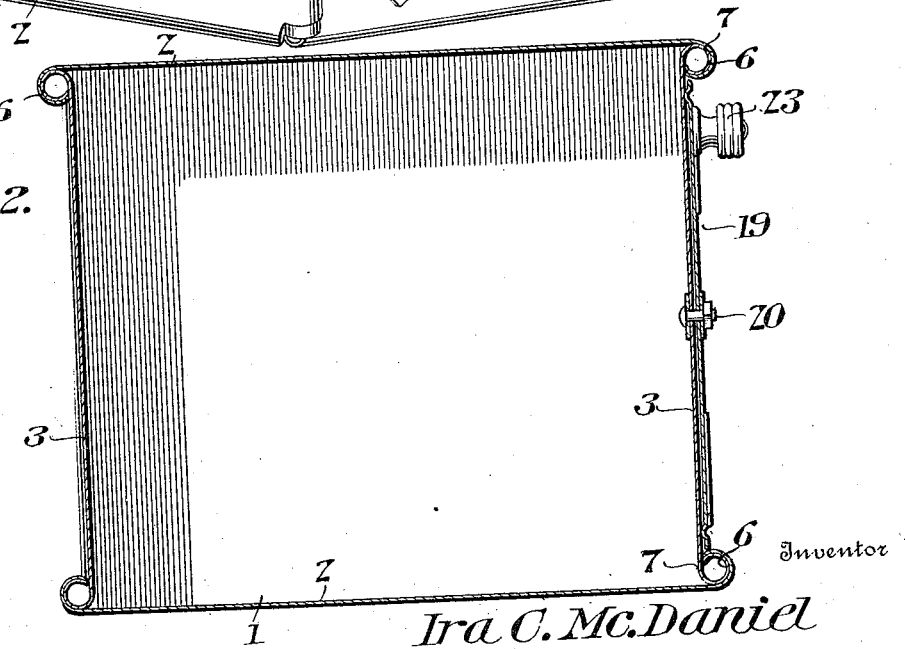

In the accompanying drawings: Figure 1 is a perspective view of a poultry coop constructed in accordance with the present invention. Fig. 2 is a horizontal sectional view therethrough. Fig. 3 is a vertical cross sectional view through the same. Fig. 4 is a collective view showing the front wall and the closure for the openings therein in perspective.

Referring now to the drawings in detail, 1 designates the bottom wall, 2, 2 the side walls and 3, 3 the end walls respectively. The side and end edges of the bottom wall 1 are provided with downwardly or outwardly rolled beads 4 while the lower edges of the side and end walls are provided with inwardly half rolled beads 5 that receive the beads 4 respectively on the bottom wall. The vertical side edges of the end walls 3, 3 are provided with outwardly rolled beads 6 while the similar edges of the side walls 2, 2 are provided with inwardly rolled beads 7 that slidably receive the beads 6 on the end walls 3. The upper end portions of the end walls 3, 3 project beyond the upper edges of the side walls 2, 2 and are triangular in shape and the upwardly inclined edges of the triangular portions of the end walls are formed to provide outwardly rolled beads 8.

9, 9 designate top forming sections respectively each having the lower edge thereof provided with an inwardly half rolled bead 10 designed to receive an outwardly rolled bead 11 formed on the upper edge of the adjacent side wall 2, and the side edges thereof provided with inwardly rolled beads 12 adapted to receive the beads 8 on the adjacent edges of the triangular portions of the end walls 3. The upper edges of the top forming sections 9 are provided with outwardly rolled beads 13 and engaging these beads 13 respectively are inwardly rolled beads 14 formed on the edges of a locking strip 15.

In assembling the bottom, side and end walls and the sections of the top wall into coop formation, the half beads on the lower edges of the end walls 3 are engaged with the beads on the end edges of the bottom wall. The beads on the side edges of the side walls 2 are now slipped over the respective beads on the vertical edges of end walls and the side walls slid into position, the half beads on the lower edges of the side walls receiving the beads on the side edges of the bottom wall. The beads on the side edges of the top forming sections 9, 9 are slipped over the respective beads on the inclined edges of the triangular portions of the end walls 3 and the top forming sections slid into position. When the top forming sections are in top formation the inwardly turned half beads on the lower edges thereof engage the outwardly turned beads on the top edges of the side walls, and the beads 14 on the locking strip 15 are slid onto the beads 13 on the upper edges of the top forming sections to lock the latter and the various walls in coop formation.

In accordance with the present invention, the front end wall 3 of the coop is formed with an entrance and exit opening 16 adjacent to the lower edge thereof and with a ventilating opening 17 in the upper portion thereof, the major portions of the openings 16 and 17 being disposed at the relatively opposite sides of the vertical medial line of the front end wall. The ventilating opening 17 is covered by a screen 18 secured to the walls of the opening 17.

19 designates a circular disk forming a door for the opening 16 in the front wall of the casing. This disk 19 is formed centrally with a pivot opening that alines with a similar opening formed in the front end wall of the coop between the openings 16 and 17 and in the vertical center line of the wall and passed through these openings is a pivot pin 20 about which the disk 19 may be revolved. Formed in the disk 19 adjacent to the periphery thereof is an opening 21 adapted to register with the openings 16 and 17 and also formed in the disk 19 is a relatively small opening 22 adapted to be brought into registration with the opening 16. The outer surface of the disk 19 adjacent to the periphery thereof is equipped with an operating handle 23. In practice, when it is desired to permit the young fowls and mother fowl to enter and leave the coop together the disk 19 is rotated to bring the opening 21 into registration with the opening 16, and when it is desired to close the coop so as to keep the fowls in the coop, the disk is rotated to move the opening 21 out of registration with the opening 16 and into registration with the ventilating opening 17, thereby enabling the coop to be ventilated while occupied. For the purpose of holding the mother fowl in the coop and permitting the young fowl to enter and leave the coop at will the disk 19 is rotated about the pin 20 to bring the relatively small opening into registration with the exit and entrance opening 16 in the front end wall of the coop.

From the foregoing description taken in connection with the accompanying drawings, the construction and manner of employing and dismantling my improved poultry coop will be readily apparent. It will be seen that I have provided a poultry coop wherein the bottom, side, end and top walls may be readily assembled and disassembled and wherein the bottom wall is held out of contact with the ground.

I claim:

A poultry coop comprising bottom, side, end and top walls, the front end wall being formed with an entrance and exit opening in the bottom portion thereof and a ventilating opening in the top portion thereof, a screen closing said ventilating opening the major portions of said openings being disposed upon relatively opposite sides of the vertical center line of said front end wall, a vertical plate in face to face contact with said front end wall, a pivot bolt passed through the center portion of said plate, and the center portion of said front end wall about which said plate may be rotated, said plate being formed with an opening movable into and out of registration with the first-mentioned openings in said front wall, and with a relatively small opening movable into and out of registration with the exit and entrance opening in said front wall, and means on said disk whereby the latter may be rotated.

In testimony whereof I affix my signature in presence of two witnesses.

IRA C. McDANIEL.

Witnesses:
 CHAS. A. LEITNER,
 OTTO F. DAY.

Copies of this patent may be obtained for five cents each, by addressing the "Commissioner of Patents, Washington, D. C."